United States Patent [19]
Bourgois et al.

[11] Patent Number: 4,722,210
[45] Date of Patent: Feb. 2, 1988

[54] PROCESS FOR THE MANUFACTURE OF HOSE OR TUBING WITH A HIGH RESISTANCE TO PRESSURE AND FATIGUE

[75] Inventors: Luc Bourgois, Waregem; Urbain D'Haene, Kuurne; Godfried Vanneste, Ingelmunster, all of Belgium

[73] Assignee: N.V. Bekaert S.A., Zwevegem, Belgium

[21] Appl. No.: 833,024

[22] Filed: Feb. 26, 1986

[30] Foreign Application Priority Data

Apr. 29, 1985 [LU] Luxembourg .......................... 85874

[51] Int. Cl.⁴ .......................................... B21D 26/02
[52] U.S. Cl. .......................................... 72/58; 72/54; 138/127; 138/133; 138/DIG. 5; 29/446
[58] Field of Search .............. 138/123, 127, 133, 130, 138/DIG. 5; 72/54, 56, 58; 29/404, 446, 421 R

[56] References Cited

U.S. PATENT DOCUMENTS

| | | |
|---|---|---|
| 3,463,197 | 8/1969 | Slade . |
| 3,725,167 | 4/1973 | Love et al. . |
| 3,880,195 | 4/1975 | Goodrich et al. ............ 138/DIG. 5 |
| 4,567,917 | 2/1986 | Millard ............................... 138/127 |

FOREIGN PATENT DOCUMENTS

| | | |
|---|---|---|
| 921240 | 11/1954 | Fed. Rep. of Germany . |
| 1210982 | 2/1966 | Fed. Rep. of Germany . |
| 35375 | 10/1957 | Luxembourg . |

OTHER PUBLICATIONS

"Cylindrical Metal Pressure Bodies . . . ", Denoor and Tascher, 11/1970, pp. 877–879.

Primary Examiner—Robert L. Spruill
Assistant Examiner—David B. Jones
Attorney, Agent, or Firm—Schwartz, Jeffery, Schwaab, Mack, Blumenthal & Evans

[57] ABSTRACT

A process for the manufacture of hose or tubing conditions plastic high pressure hose having at least one reinforcing layer of steel wires, cords or longitudinal segments thereof. The hose is internally pressurized for a predetermined period of time which provides a residual permanent elongation of at least 0.5% and increases the interior volume by at least 2% upon release of the pressure.

9 Claims, 3 Drawing Figures

PROCESS FOR THE MANUFACTURE OF HOSE OR TUBING WITH A HIGH RESISTANCE TO PRESSURE AND FATIGUE

FIELD OF THE INVENTION

The present invention relates to a process for manufacturing plastic hose or tubing with a reinforced wall and a high level of resistance to pressure and fatigue. The plastic hose or tubing thus obtained can be either flexible (e.g. hydraulic hose) or more or less rigid. In general, it consists of an elastomeric material such as rubber or a more or less rigid resin material, reinforced with steel wire or cord. The process which is the subject of the invention consists in particular of a conditioning treatment applied to increase fatigue resistance of the tubing or hose.

RELATED ART

In general, reinforcing wires or cords are incorporated into the tubing in the form of radial or spiral winding or of woven or braided strips. When the reinforcing elements are in a single layer, this layer must be able to withstand tensile stresses created inside the wall whenever the tubing is subjected to internal pressure. On the other hand, when several layers of reinforcing elements are superimposed within the tube wall, it is in general the inside layer which absorbs the larger part of the tensile stresses within the wall produced when the tubing is subjected to internal pressure. In this case the outside layers act primarily as a barrier to prevent excessive dilation of the wall under internal pressure. Hence, in the case of high pressure resistant tubing, the stress within these outside layers will in general be below the conventional yield strength, and their primary function will be to provide support for the reinforced material and for the reinforcing layers situated nearer the inner side of the wall.

This means that, in the case of tubing consisting of several superimposed layers of reinforcing wire or cord, the outside layers can consist, for example, of conventional steel wire or cord or of strips woven or braided from such, without any notable decrease of fatigue resistance.

In the case of tubing reinforced with one or several layers of braided steel wire, attempts have been made to increase fatigue resistance by means of preconditioning. A U.S. Pat. No. 3,725,167 describes the submitting of hydraulic hoses to high internal pressure (the so-called preconditioning treatment) with a view to increasing its resistance to pressure pulse cycles, i.e. its fatigue resistance and hence its working life. By applying a temporary or transitory increase in internal pressure, which, according to this particular patent, can in general be as much as 85–90% of its burst pressure, the steel reinforcing wires are forced into more or less perfect alignment. As a result, tension is more evenly distributed within the hose wall to each of the individual reinforcing wires or wire segments, thereby increasing fatigue resistance. However, when the preconditioning treatment is applied, as described in the patent, the steel reinforcing wires, being conventional wires, cannot be subjected to tension in excess of their yield strength. Otherwise one risks overloading certain wires beyond their ultimate breaking strength, thereby risking breaking certain wires and destroying the reinforcing effect. In practice, during this preconditioning treatment conventional wires are not generally subjected to loads greater than 65% of their conventional yield strength.

SUMMARY

Whilst the above-mentioned preconditioning treatment appears to increase fatigue resistance, the present invention permits this resistance to be considerably increased.

In particular it has been found that, for tubing with a single reinforcing layer, the use of steel wire with an elongation at rupture of between 4.5 and 6% permits an even more balanced distribution of tension within the tube wall during preconditioning treatment similar to that described above, in other words in so far as the temporary internal pressure applied is greater than 90% of burst pressure. This results in a further increase in the fatigue resistance of the tube.

In the same way a more balanced distribution of tension can be effected within the wall of a tube including several superimposed layers of reinforcing wire by using steel wire with an elongation at rupture of between 4.5 and 6% in one or more layers close to the inside of the tubing. The reinforcing layers towards the outside of the tube can then if required consist of conventional steel wire, i.e. with an elongation at rupture of approx. 2%, depending also on other parameters such as, for example, the compressibility of the rubber, the thickness of the wall, etc.

The present invention relates therefore to a process for conditioning plastic tubing which contains within its wall at least one reinforcing layer of steel wire or cord, in which such reinforced tubing is submitted, following manufacturing, for a certain period of time (i.e. temporarily) to an internal conditioning pressure which is subsequently released. The temporary application of pressure results then in a premanent residual elongation of the wires, cords or longitudinal segments of such in the amount of at least 0.5%. The amount of this premanent elongation will depend to a large extent on the degree of uniformity and regularity of the disposition and arrangement of the wires within the wall.

Where the wires are evenly distributed, this 0.5% elongation will be sufficient, whereas, where disposition is less regular, this permanent residual elongation figure may increase beyond 2.5% or even beyond 4% for certain wires or wire segments. In the case of braided strip reinforcement, the actual stress in each wire segment will also depend on the level of pinching exerted principally by the outside wires (side wires) of each strip on the outside wires of the strips laid cross-wise to them and touching the original strip. This pinching normally gives rise to a form of stress which is not simply tensile or traction, but is more complex, including transverse compression forces on certain points along the wires.

As a result such wires are stretched, at least in certain longitudinal segments, beyond their conventional yield strength. During application of internal pressure, these wires or wire segments are namely stretched temporarily (transitorily) beyond 4%. The internal pressure is then released, either in part or in whole. No wire is stretched beyond its elongation at rupture. The effect of the application of the internal conditioning pressure is to increase the interior volume of the tube by at least 2% following the release of this pressure. In fact, during application of this pressure, this interior volume may be temporarily increased by 6% or even 9% or more in relation to its intitial volume. The internal pressure applied is greater than 90% of the burst pressure of the tubing.

Conditioning can be carried out immediately following manufacture of the tubing. Otherwise it can also be applied when tubing is being installed, for example during pre-commissioning controls or operating tests on installations equipped with (hydraulic) hoses according to the invention before being put into regular use. Furthermore, conditioning can take place in several stages or steps during set up and/or ongoing operation of installations equipped with such tubing, i.e. as and when the tubing is used for the applications for which it has been designed.

If it is desired to carry out the conditioning in one stage, the pressure pulse should preferably last between 0.1 and 65 seconds.

BRIEF DESCRIPTION OF THE DRAWINGS

Other advantages and operating details relating to the invention will now be described with reference to the attached drawings, wherein.

DETAILED DESCRIPTION OF THE INVENTION

Figure 2:
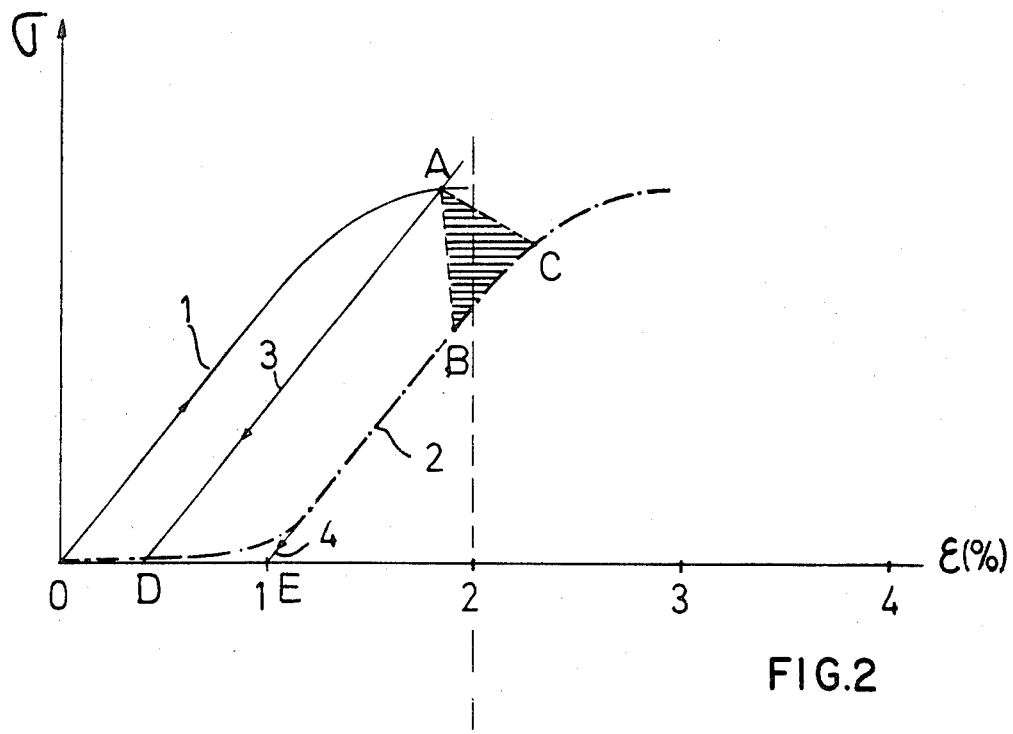
FIG. 2 gives similar information in graph form for state of the art tubing.

When the reinforcing wire is applied during the manufacturing process of the hoses, it is in practice impossible to obtain the same level of tension or extension in all wires or wire segments. As shown in FIG. 2, one particular wire or wire segment 1 can be slightly tensioned whilst at the same time another wire or wire segment 2 can be more or less slack. This means that when internal conditioning pressure is applied following construction of the tubing, the tension load ($\sigma$) on these two wires 1 and 2 will be different, giving rise to different deformation values ($\epsilon$-%). This situation is shown by the shaded triangle ABC in FIG. 2.

If the elastomeric or plastic material is in itself relatively rigid and/or the tubing wall is thick, the tubing wall will absorb a considerable portion of the internal pressure (which therefore will not be transmitted to the reinforcing wires). In this case, the loading of wires 1 and 2 may correspond to points A and B respectively in FIG. 2. Point A gives the maximum tension which can be withstood by wires 1 without risk of breaking. FIG. 2 shows clearly that at this tension level wire 2 is temporarily displaced due to alignment as well as an elastic deformation in conformity with point B.

When the internal pressure is released, the wires decontract as per lines 3, or 2 and 4 respectively, resulting in permanent residual elongation in wire 1 represented by point D and in the case of wire 2 by point E or a point situated between 0% and E. (The 1% elongation: point E - of wire 2 consists solely of an increase in length due entirely to the alignment of this wire from a non-tensioned and non-aligned position towards a tensioned and aligned position.) On the other hand the elongation by about 0.4% (point D) relates to the elongation (plastic deformation) of wire 1 due to conditioning. The relative difference in displacement between one wire (1) and another (2) can therefore be considerable (e.g. from 0% to 1% or more for a wire 2 against 0.3% to 0.4% for a wire 1). In other words, a balance of internal tensions within the wall can hardly be achieved or guaranteed in a uniform manner.

The same applies to reinforced tubing manufactured from relatively flexible and elastic elastomeric material. In such a case the loading of wires 1 and 2 corresponds to points A and C, point A representing the limit which cannot be exceeded without the risk of reaching the burst pressure of the reinforced tubing. This results in fact in a similar situation as regards internal tensions within the elastomer, since wires 1 and 2 respectively, retain after decontraction a residual elongation within the tubing, represented by points D and E respectively (or a point between D and E or in extreme cases between E and 0% in the case of wire 2).

Figure 1:
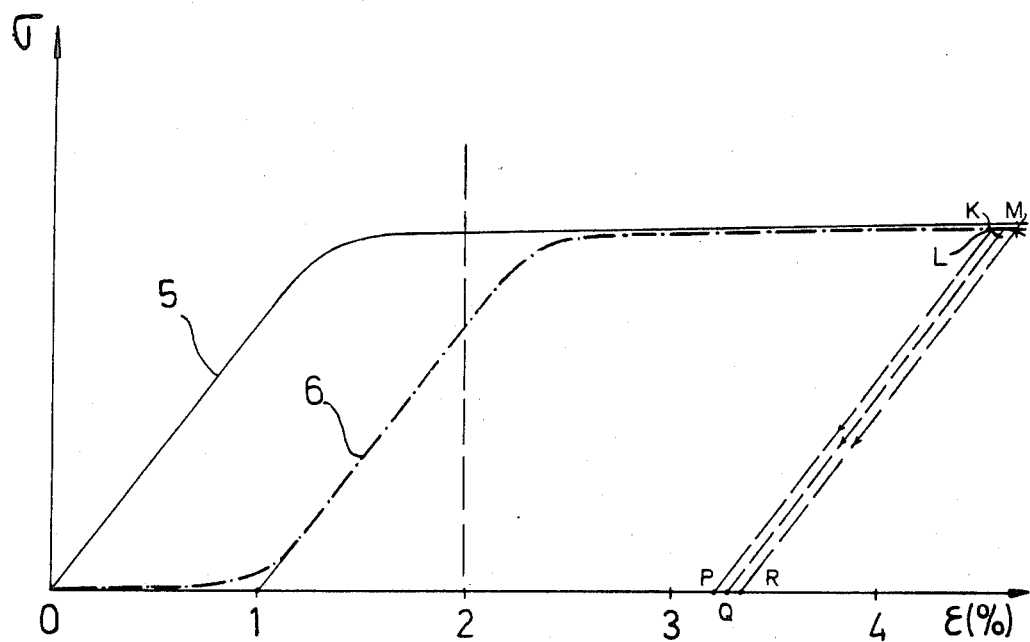
FIG. 1 shows in schematic graph form the stress-strain behaviour of different reinforcing wires when the tubing is submitted to internal conditioning pressure in accordance with the invention.

This critical situation can be avoided now by the use of steel wires with a higher elongation at rupture, i.e. the risk of reaching the breaking limit of certain wires diminishes if a conditioning treatment as described above is applied. As can be seen from FIG. 1, the applicable internal conditioning pressure is less critical. In fact all wires 5 and 6 absorb a more or less equal portion of the tension when loaded at a level beyond their yield strength, e.g. at a level corresponding to points K,L or K,M respectively in FIG. 1. Thus, for a fairly rigid elastomer or for an equivalent situation as described above, the application of conditioning pressure gives rise to a loading level equal to point K in wire 5 and L in wire 6. The permanent residual deformation once this internal pressure has been removed is situated between points P and Q. In the case of more flexible elastomers, tension moves from point K for wire 5 and M for wire 6 to points P and R, respectively. It is therefore now possible to increase the internal conditioning pressure to a level closer to the burst pressure of the tubing, for example, beyond 95% of such pressure. This pressure therefore allows the wires to be stretched in general to a tension well above 90% of their breaking tension. In particular points K, L and M are situated at a level of 98 or 99% to this breaking tension, and this applies generally to almost all the wires or wire segments. This means that all wires or wire segments are loaded at a more or less equal level. Furthermore, once internal pressure is released all wires have been loaded in such a way as to bring about a readily definable level of permanent plastic deformation (points P, Q, R) whilst wires 2, according to the state of the art, could only undergo irregular and uncontrollable elastic deformation resulting from residual elongation within the wall varying from one wire to another, between 0% and 1% or more (as shown by point E). This means that the balance of internal tensions inside the wall is obtained much more effectively than by preconditioning methods according to the state of the art, giving rise to a considerably improved fatigue resistance.

For a hose with a single reinforcing layer, conditioning may be carried out with the hose inserted inside a tube or rigid retaining mould. This retaining tube then takes on the role of barrier as performed by the outer reinforcing layers in the case of a hose with multiple reinforcing layers.

One embodiment of the invention will now be described by way of example with an illustration of the effects obtained by reference to an analysis of simulation tests for determining fatigue resistance.

A reinforcing steel wire with an elongation at rupture of at least 3% is obtained as follows. A steel wire with a carbon content of between 0.70% and 1.00% and preferably between 0.84 and 0.87% is covered with a layer of brass in order to provide adhesion to the rubber. This wire has a breaking strength of between 2,700 and 3,100 N/mm$^2$ and an elongation at rupture of around 2%. The diameter of the wire can be between 0.25 mm and 0.71 mm. In order to increase the elongation at rupture of the wire to a level of 5%, the wire is heated electrically. This thermal treatment reduces the breaking strength to between 2,150 and 2,500 N/mm$^2$, which is still an acceptable level for this kind of reinforcing wire. In any case, the parameters of temperature and duration of the thermal treatment can be adapted in order to optimize the desired elongation and breaking strength characteristics. Thus, for a 0.3 mm metal wire (carbon content 0.85%) with an initial breaking strength of 3,000 N/mm$^2$ and an elongation at rupture of 2.2%, it has been found that thermal tretment at a certain temperature and for a certain period of time brings about a reduction of breaking strength of about 10% without any increase in elongation at rupture. However, by increasing the temperature slightly over a similar treatment period we note that breaking strength decreases as a linear function of the temperature applied and that elongation at rupture rapidly increases to reach a maximum level of almost 6% once breaking strength has been reduced to about 2,500 N/mm$^2$. If the wire is heated at an even higher temperature for the same period of time, the above-mentioned breaking strength decreases linearly to approximately 2,100 N/mm$^2$, whilst the resulting elongation diminishes almost linearly to a level of 4.5%.

If an even higher temperature is applied for the same period of time, elongation at rupture drops back fairly quickly to a level of 2%, accompanied by a continuous linear (still the same line) reduction in ultimate breaking strength down to 1,900 N/mm$^2$. In conclusion, we can state that an elongation at rupture of between 4.5% and 6% is attainable at a breaking strength of between 2,100 and 2,500 N/mm$^2$.

In order to simulate the behaviour of steel wires 5 and 6 with an elongation at rupture within the tubing of more than 3%, in particular in order to determine fatigue resistance and to compare it with the behaviour of a conventional tube reinforcing steel wire, we have proceeded as follows.

Of course, when submitting a steel wire or cord with a higher initial breaking strength such as 3300 N/mm$^2$ or more to a thermal treatment as described above, the resulting ultimate tensile strength will be between about 2500 and 3100 N/mm$^2$ for an elongation capacity of between 4.5% and 6%.

Figure 3:
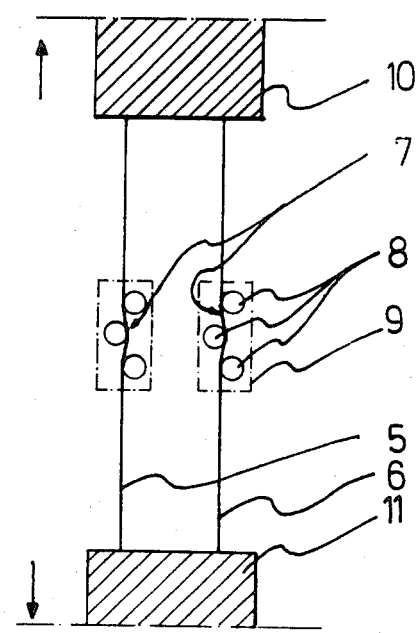
FIG. 3 depicts a simulation device for evaluating the behaviour of wires in tubes conditioned according to the invention.

Two steel wires, 5 and 6, with a diameter of 0.30 mm, a carbon content of 0.84% and an elongation at rupture of 5 to 6% at a breaking strength of 2,347 N/mm$^2$ were fixed into a device as depicted in FIG. 3.

This device consists of two clamp holders (10,11), as found in a conventional apparatus for examining stretching resistance and tensile strength. Wire 5 is placed in this apparatus at a pre-tension of 20 N, whilst wire 6 is subjected to a pre-tension of only 5 N. This difference in tension is in order to simulate real life situations where certain wires 5 within the tubing wall are subject to tension whilst others 6 are subject to virtually no tension at all. The two wires are pinched at point 7 by means of a braking element consisting of three shanks fixed into a frame 9. This arrangement allows us to simulate the real life case of wires in, for example, a braided reinforcement sleeve for a hose in which the wires are more or less pinched where the braided wire strips cross each other. The braking shanks 8 give rise in particular to friction and transverse pinching (compression) on wire segments 5 and 6, either at positions 7 or just before and after these positions. This means that these segments are subjected not only to tensile forces but at the same time to a greater and more complex loading and stress. In order to evaluate their fatigue resistance, wires 5 and 6 are then subjected to a cyclical (sinusoidal) stretching tension with a frequency of 50 Hz. The tension applied alternates between 150 N/mm$^2$ and 1,250 N/mm$^2$. In this test wire 5 broke after some 10$^4$ cycles.

The same test was then repeated for wires 5 and 6. However, before subjecting them to the cyclical tension test, they were stretched for one minute in the device depicted in FIG. 3 at a stretching tension equal to 90% of their breaking strength. The result of this preliminary stretching, simulating preconditioning according to the invention, was that wire 5 broke only after some 10$^6$ cycles. It should also be noted that breaking occurred always at or close to position 7.

After preliminary stretching at 60% of the breaking strength (for a period of one minute), wire 5 broke after approximately the same number of cycles (10$^6$). It is also obvious that, when the wire is first stretched to this level of 60%, the wire segments in the proximity of point 7 are stretched (loaded) beyond this 60% level.

These stretching tests described above were then repeated using conventional hose reinforcing steel wires 1 and 2 with an elongation at rupture of between 1.5% and 2%. Wires 1 and 2 used in this test had a tensile strength of 2,680 N/mm$^2$ (prior to aging by thermal treatment at a temperature of 150° during one hour). This thermal pre-treatment was applied in order to simulate the behaviour of wires incorporated into reinforced tubing which is then vulcanized. It is known that this thermal treatment has the effect of diminishing elongation at rupture. Following thermal treatment, wires 1 and 2 were fastened in the stretching device described above, in lieu of wires 5 and 6, and pinched at position 7 between shanks 8. Wire 1 was pre-stressed at a tension of 20 N whilst wire 2 was pre-stressed at 5 N. Alternating tension of between 150 N/mm$^2$ and 1,250 N/mm$^2$ was applied as described above and wire 1 broke once again after about 10,000 cycles.

The stretching test was then repeated on aged wires 1 and 2, which had, however, been pre-stretched to 60% of their breaking strength (for a period of one minute). The same cyclical traction test was applied in order to determine their fatigue resistance, with the following result: more than two thirds of wires 1 broke after about 10$^4$ cycles whilst the rest broke after a higher number of cycles.

This indicates that conventional wires 1 and 2 cannot ensure or guarantee a higher level of fatigue resistance for reinforced tubing. Moreover, a repetition of the test on wires 1 and 2, but with pre-stretching to a level of 90% of their ultimate breaking strength, was not possible since wire 1 used to break before reaching this pre-stretching level for the two wires.

These simulation tests lead us to conclude that the utilization of wires 5 and 6 with a high elongation at rupture ensures noticeably higher fatigue resistance than conventional reinforcing wires 1 and 2 (with an elongation at rupture of 1% to 2%), providing they have been pre-stretched, for example by a tube conditioning treatment as described above. In practice such tube conditioning treatment can be carried out in a number of different ways. The internal pressure can be effected by, for example, gas or liquid under pressure, or by the insertion of metal parts pressed appropriately against the inner wall of the tube in such a way as to stretch and extend the inner circumference. One way of performing this will be described below by way of an example.

A hydraulic hose of traditional construction, but containing steel wires with a high elongation at rupture in accordance with the invention can (once it has been manufactured and the reinforcing material vulcanized or polymerized) be conditioned, by way of an example, as follows: the tubing is placed inside a retaining moulding completely surrounding its outside surface. One end of the tube is then closed tight in a suitable manner and the tube filled with a liquid in order to determine the inside volume. This liquid is then placed under pressure by adding a quantity of at least 6% in relation to the initial volume and maintaining this pressure for a period of between 0.1 and 65 seconds. The pressure is then released and part of the liquid evacuated until pressure has fallen, for example, back to atmospheric pressure.

The amount of liquid evacuated is then measured, and from this figure we can easily derive the increase in volume of the hose resulting from the conditioning. (For the sake of this examination the liquid can be considered to be incompressible). In the case of tubing with wire reinforcing layers disposed helically inside the wall at an angle of 54° to the axis of the tube, it is known that an elongation of the wires by a certain percentage (x) results in an increase in the volume of the tube of approximately 3 x %. The cyclical application of internal pressure pulses then allows us to estimate the improvement in the fatigue resistance of the tubing conditioned in accordance with the invention by comparison with conventional tubing.

The invention is applicable to flexible hydraulic hoses, but equally to off-shore piping and more or less flexible drilling pipes, reinforced, for example, by layers of cords or steel cables.

We claim:

1. A process for conditioning a plastic high pressure hose comprising the steps of providing in its wall at least one reinforcing layer of steel wires or cords having an elongation at rupture in the range of 4.5% to 6%, internally pressurizing the hose for a predetermined time interval which pressure is released thereafter and wherein, due to this temporary application of internal pressure, the wires, cords or longitudinal segments thereof in the inner reinforcing layer or layers in the hose receive a residual permanent elongation of at least 0.5% and whereby the interior volume of the hose is increased by at least 2% after release of said pressure.

2. Process according to claim 1, wherein the interior volume is transitorily increased by at least 6%.

3. Process according to claim 1, wherein the applied internal pressure is at least 90% of the burst pressure of the hose.

4. Process according to claim 1, wherein the time interval for applying internal pressure is between 0.1 and 65 sec..

5. A process for conditioning steel wire reinforced plastic high pressure hose and the like, comprising:
    selecting a steel wire reinforced plastic high pressure hose comprising at least one innermost reinforcing layer, said layer comprising steel wires or cords having an elongation at rupture in the range of 4.5% to 6%,
    internally pressurizing the hose for a predetermined time interval, and
    providing a residual permanent elongation of at least 0.5% and increasing the interior volume of the hose by at least 2% upon release of the pressure.

6. A process according to claim 5, wherein the interior volume is transitorily increased by at least 6%.

7. A process according to claim 5, wherein the applied internal pressure is at least 90% of the burst pressure of the hose.

8. A process according to claim 6, wherein the applied internal pressure is at least 90% of the burst pressure of the hose.

9. A process according to claim 5, wherein the time interval for applying internal pressure is betwen 0.1 and 65 seconds.

* * * * *